(12) United States Patent
Yang

(10) Patent No.: US 9,503,716 B2
(45) Date of Patent: Nov. 22, 2016

(54) BLOCK SIZE DEPENDENT FILTER SELECTION FOR MOTION COMPENSATION

(71) Applicant: Broadcom Corporation, Irvine, CA (US)

(72) Inventor: Zhijie Yang, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 724 days.

(21) Appl. No.: 13/711,873

(22) Filed: Dec. 12, 2012

(65) Prior Publication Data

US 2013/0156096 A1 Jun. 20, 2013

Related U.S. Application Data

(60) Provisional application No. 61/577,402, filed on Dec. 19, 2011.

(51) Int. Cl.
*H04N 7/26* (2006.01)
*H04N 19/117* (2014.01)
*H04N 19/176* (2014.01)
*H04N 19/136* (2014.01)
*H04N 19/523* (2014.01)

(52) U.S. Cl.
CPC ...... *H04N 19/00066* (2013.01); *H04N 19/117* (2014.11); *H04N 19/136* (2014.11); *H04N 19/176* (2014.11); *H04N 19/523* (2014.11)

(58) Field of Classification Search
None
See application file for complete search history.

(56) References Cited

U.S. PATENT DOCUMENTS

| | | | |
|---|---|---|---|
| 2006/0062302 A1* | 3/2006 | Yin et al. | 375/240.16 |
| 2008/0130742 A1* | 6/2008 | Scheuermann | 375/240.02 |
| 2011/0122950 A1* | 5/2011 | Ji et al. | 375/240.16 |

* cited by examiner

*Primary Examiner* — Frederick Bailey
(74) *Attorney, Agent, or Firm* — Foley & Lardner LLP; Christopher J. McKenna; Daniel E. Rose

(57) ABSTRACT

Disclosed are various embodiments for determining a filter length according to a width and height of the reference block and selecting a filter based on the block size. Corresponding pixels from memory may be fetched based on the filter length and the block size. Reference pixels may be interpolated based on the selected filter to generate a prediction.

20 Claims, 3 Drawing Sheets

BLOCK SIZE DEPENDENT FILTER SELECTION FOR MOTION COMPENSATION

CROSS REFERENCE TO RELATED APPLICATIONS

This application claims priority to U.S. provisional application entitled "BLOCK SIZE DEPENDENT FILTER SELECTION FOR MOTION COMPENSATION" assigned Ser. No. 61/577,402, filed Dec. 19, 2011, the entirety of which is hereby incorporated by reference herein.

BACKGROUND

With respect to video coding, sub-pixel interpolation is used in various modern video codecs to increase motion compensation efficiency. Sub-pixel interpolation involves the use of a sub-pel filter to interpolate a reference picture to increase the inter-prediction accuracy. Experimental results show that well-designed long filters can achieve significant better coding efficiency compared with short filters. On the other hand, in a pipelined decoding system, a reference block is fetched and filtered for each inter-prediction block. Longer filters need extra pixels to be fetched each time and hence generally cause dramatic memory expansion.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
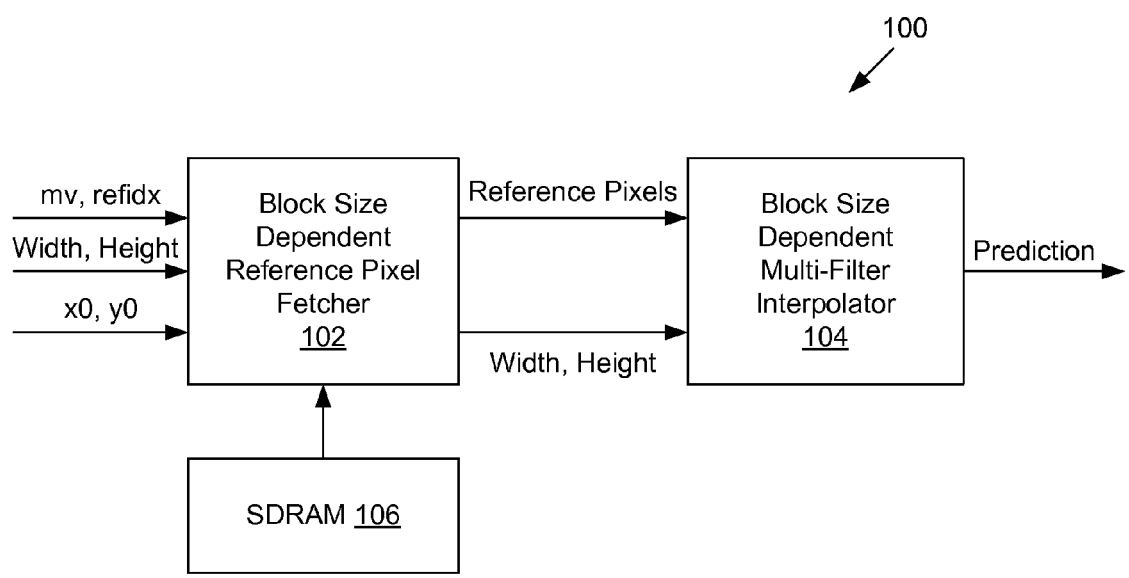
FIG. 1 is a block diagram of an example embodiment of a motion compensation and filtering system according to various embodiments of the present disclosure.

The present disclosure relates to motion compensation and filtering. As may be appreciated, motion compensation is used in the compression of video data. A motion compensation and filtering system may comprise a block size dependent motion compensation engine composed of a block size dependent reference pixel fetcher and a block size dependent multi-filter interpolator. As a non-limiting example, a pixel fetcher may determine a filter length according to the block width and height, and hence may decide a number of pixels to fetch from memory. One embodiment of a multi-filter interpolator includes multiple filters, wherein the interpolator chooses one of the filters according to the block size. In various embodiments, a motion compensation and filtering system may further comprise restrictions on block sizes, in addition to the block size dependent filter selection techniques, in order to reduce worst-case memory bandwidth expansion.

While the disclosure is described in connection with FIGS. 1-3, there is no intent to limit the disclosure to the embodiment or embodiments disclosed herein. For instance, though described in the context of luma-based motion compensation, certain embodiments of motion compensation and filtering systems may be applied to chroma-based motion compensation. Although the description identifies or describes specifics of one or more embodiments, such specifics are not necessarily part of every embodiment, nor are all various stated advantages associated with a single embodiment.

Table 1 (reproduced below), illustrates an example memory bandwidth expansion for different block sizes and filter lengths. A memory bandwidth expansion is calculated as the ratio between the number of pixels that need to be fetched and the number of pixels of the original block. The actual memory bandwidth expansion may vary than the listed number due to word alignment and the use of cache strategy. From Table 1, the memory bandwidth expansion ranges from 116.24% to 1406.25%, according to different block sizes and filter lengths. The smaller the block size and the longer the filter, the more memory bandwidth the motion compensation engine consumes.

TABLE 1

Memory bandwidth expansion for different motion block sizes

| Block Size | | Memory Bandwidth Expansion | | |
|---|---|---|---|---|
| Width | Height | 6-tap | 8-tap | 12-tap |
| 4 | 4 | 506.25% | 756.25% | 1406.25% |
| 4 | 8 | 365.63% | 515.63% | 890.63% |
| 8 | 4 | 365.63% | 515.63% | 890.63% |
| 8 | 8 | 264.06% | 351.56% | 564.06% |
| 16 | 8 | 213.28% | 269.53% | 400.78% |
| 8 | 16 | 213.28% | 269.53% | 400.78% |
| 16 | 16 | 172.27% | 206.64% | 284.77% |
| 32 | 16 | 151.76% | 175.20% | 226.76% |
| 16 | 32 | 151.76% | 175.20% | 226.76% |
| 32 | 32 | 133.69% | 148.54% | 180.57% |
| 64 | 32 | 124.66% | 135.21% | 157.47% |
| 32 | 64 | 124.66% | 135.21% | 157.47% |
| 64 | 64 | 116.24% | 123.07% | 137.33% |
| Worst Case | | 506.25% | 756.25% | 1406.25% |
| Average Case | | 223.32% | 290.55% | 455.71% |

With increasing demand for higher resolution video content (e.g., from standard definition (SD) to high definition (HD), or even super HD content (4K×2K)), the memory bandwidth cost becomes more and more of a bottleneck in a decoding system design. For instance, as shown in Table 2 (reproduced below), if 12-tap filter and 4×4 motion block size are both used, the worst case memory bandwidth requirement for the luma component alone for 4k×2 kp60 is 12.7 Gbps (Giga-bits per second).

TABLE 2

Worst case memory bandwidth consumption for a luma motion compensator

| Video Format | Worst Case Memory Bandwidth Consumption for Luma Motion Compensation (Mbps) | | |
|---|---|---|---|
| | 6-tap | 8-tap | 12-tap |
| 1080p30 | 605.1269531 | 903.9550781 | 1680.908203 |
| 1080p60 | 1210.253906 | 1807.910156 | 3361.816406 |
| 4kx2kp30 | 2430 | 3630 | 6750 |
| 4kx2kp60 | 4556.25 | 6806.25 | 12656.25 |

Certain embodiments of motion compensation and filtering systems, with its block size dependent filter selection scheme, may be employed to more efficiently utilize long interpolation filters to improve the coding efficiency within reasonable memory bandwidth constraints. In the following discussion, a general description of a motion compensation and filtering system and its components is provided, followed by a discussion of the operation of the same.

With reference to FIG. 1, shown is a block diagram of an example embodiment of a motion compensation and filtering system. As a non-limiting example, the motion compensation and filtering system depicted in FIG. 1 comprises a block size dependent motion compensation engine 100, which includes a block size dependent reference pixel fetcher 102 communicatively coupled at its output to a block size dependent multi-filter interpolator 104. The pixel fetcher 102 receives at its input information that includes one or more motion vectors (mv) and associated reference picture index (refidx), a width and height of the reference block, and the spatial coordinates of the reference block (x0, y0). The block size dependent motion compensation engine 100 may be used for short filters for small block sizes and long filters for large block sizes. The determination of what constitutes smaller (large) and short (long) depends on the given implementation. For instance, in one embodiment, a 6-tap filter may be considered a short filter, and any filter greater than or equal to 8 taps is considered a long filter. In some embodiments, a 6-tap filter may be considered a short filter, an 8-tap filter may be considered a medium filter, and a 12-tap filter may be considered a long filter. Other variations using the same or different filter sizes may be implemented, as may be appreciated. Similarly, a small block size may be any 4×4 block size in some embodiments, whereas in some embodiments, a small block size may be considered to encompass 4×4, 4×8, and 8×4. Likewise, a large block may be considered any block sizes greater than or equal to 8×8, or in some embodiments, block sizes of 16×16 or greater, among other variations.

Table 3 gives an example embodiment of a block size dependent filter selection method and the corresponding memory expansion estimation.

TABLE 3

An example of block size dependent filter selection

| Block Size | | Memory Bandwidth Expansion | | |
|---|---|---|---|---|
| Width | Height | 6-tap | 8-tap | 12-tap |
| 4 | 4 | 506.25% | — | — |
| 4 | 8 | — | 515.63% | — |
| 8 | 4 | — | 515.63% | — |
| 8 | 8 | — | 351.56% | — |
| 16 | 8 | — | — | 400.78% |
| 8 | 16 | — | — | 400.78% |
| 16 | 16 | — | — | 284.77% |
| 32 | 16 | — | — | 226.76% |
| 16 | 32 | — | — | 226.76% |
| 32 | 32 | — | — | 180.57% |
| 64 | 32 | — | — | 157.47% |
| 32 | 64 | — | — | 157.47% |
| 64 | 64 | — | — | 137.33% |
| Worst Case | | | 515.63% | |
| Average Case | | | 312.44% | |

In this non-limiting example, there are three filters to be chosen for each block size. 4×4 blocks use a short filter (e.g., 6-tap filter), 4×8, 8×4 and 8×8 blocks use an 8-tap filter, and all block sizes above 4×8 use a 12-tap filter. From a comparison of the worst case between Table 1 and Table 3, it is observed that the worst case memory bandwidth expansion in Table 3 is close to the single 6-tap system of Table 1, 31% less than the 8-tap system shown in Table 1, by utilizing the long filter to improve the coding efficiency.

As noted above, the block size dependent motion compensation engine 100 is composed of a block size dependent reference pixel fetcher 102 and a block size dependent multi-filter interpolator 104. In one embodiment, the block size dependent reference pixel fetcher 102 is configured in hardware, though some embodiments of the fetcher may be configured in software, or a combination of hardware and software. The fetcher 102 is configured to read reference pixels from a decoded picture buffer in memory, such as SDRAM 106. The fetcher 102 decides the filter length according to the block width and height. Then, according to the filter length and block size, the fetcher 102 fetches corresponding pixels from the SDRAM 106. For example, as shown in Table 3, if the block size is 4×4, a 6-tap filter is used and the fetcher 102 reads (5+4)×(5+4)=81 pixels (e.g., in a 4×4 block, five (5) additional pixels for each x0, y0 coordinate). Note that the use of 81 pixels is for illustration, and that other pixel quantities and filter types may be used.

Figure 2:
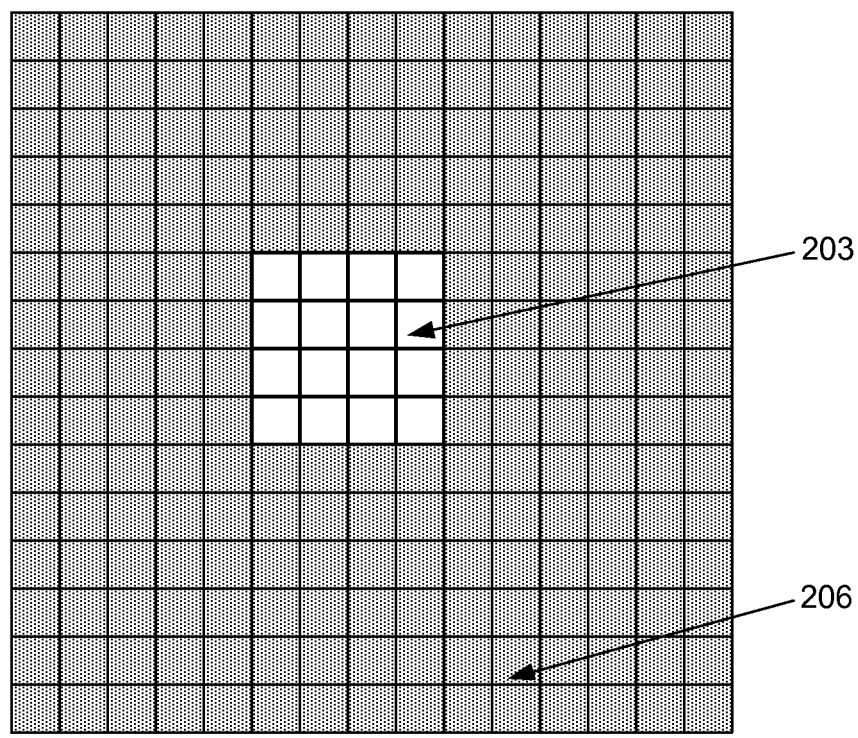
FIG. 2 is a schematic diagram that illustrates an example application of sub-pixel interpolation of a 4×4 block using a 12-tap filter as an example embodiment of the motion compensation and filtering system of FIG. 1 according to various embodiments of the present disclosure.

For instance, with reference to FIG. 2, reference pixels required for sub-pixel interpolation of a 4×4 block using a 12-tap filter is shown. The unhashed pixels 203 indicate a reference 4×4 block location. The hashed pixels 206 represent the additional locations of pixels required for 12-tap filtering. As shown, 12-tap filtering requires 13 times more pixels (i.e., the hashed pixels 206) than the original block (i.e., the unhashed pixels 203).

Returning to FIG. 1, the block size dependent multi-filter interpolator 104 is configured in hardware in one embodiment, though in some embodiments the block size dependent multi-filter interpolator 104 may be configured in software or a combination of hardware and software. The interpolator 104 includes a plurality of filters, with each filter selected according to the block size. In the above example, the interpolator 104 includes three filters (e.g., 6-tap, 8-tap and 12-tap filters), and if the block size is 4×4, the 6-tap filter is used to interpolate the reference pixels to generate the prediction.

Note that in one embodiment, operation of the fetcher 102 and interpolator 104 may be independent, wherein each respective task is performed intrinsically based on a given set of conditions (e.g., block size and filter availability). Alternatively, in some embodiments, operation of the interpolator 104 may be based on information explicitly signaled by the fetcher 102 or other processing logic. For instance, given a determination of the block size by the fetcher 102, the fetcher 102 may signal (e.g., via a flag) to the interpolator 104 the size of the block or the required filter length (e.g., 6-tap, 8-tap, etc.) to implement.

Having described certain embodiments of a motion compensation and filtering system, it should be appreciated within the context of the present disclosure that other variations are contemplated. For instance, since 4×4 motion blocks require the largest memory bandwidth expansion, some codecs may simply disable 4×4 motion blocks to reduce the memory bandwidth requirement. However, as shown in Table 4 (reproduced below), even if 4×4 motion blocks are disabled, the worst case memory bandwidth expansion can still be as high as 515.63% for an 8-tap filter and 890.63% for a 12-tap filter. This expansion may be still too high for some codec systems, such as ultra HD decoding systems. To further reduce the memory bandwidth requirement, in some embodiments, a block size restriction technique may be combined with the block size dependent filter selection methods described above. Table 5 illustrates an example method embodiment for selecting filter size (horizontal filter length and/or vertical filter length) for different block size when 4×4 motion blocks are disabled. It should be appreciated that the disablement of the 4×4 motion blocks is illustrative, and that in some embodiments, additional blocks may likewise be disabled (e.g., 4×4, 4×8, and 8×4). Moreover, disabling bi-directional prediction can also be used to reduce the memory bandwidth requirement.

In this example, 8×4 and 4×8 block sizes use a 6-tap filter, 8×8, 8×16 and 16×8 block sizes use an 8-tap filter, and all block size above 8×8, 8×16, and 16×8 use a 12-tap filter. Using this adaptive filter methodology, the worst memory bandwidth requirement is only 365.64% while more than half of the block sizes can use 12-tap filter.

TABLE 4

Memory bandwidth expansion for different motion block sizes when 4 × 4 motion block is disabled

| Block Size | | Memory Bandwidth Expansion | | |
|---|---|---|---|---|
| Width | Height | 6-tap | 8-tap | 12-tap |
| 4 | 4 | — | — | — |
| 4 | 8 | 365.63% | 515.63% | 890.63% |
| 8 | 4 | 365.63% | 515.63% | 890.63% |
| 8 | 8 | 264.06% | 351.56% | 564.06% |
| 16 | 8 | 213.28% | 269.53% | 400.78% |
| 8 | 16 | 213.28% | 269.53% | 400.78% |
| 16 | 16 | 172.27% | 206.64% | 284.77% |
| 32 | 16 | 151.76% | 175.20% | 226.76% |
| 16 | 32 | 151.76% | 175.20% | 226.76% |
| 32 | 32 | 133.69% | 148.54% | 180.57% |
| 64 | 32 | 124.66% | 135.21% | 157.47% |
| 32 | 64 | 124.66% | 135.21% | 157.47% |
| 64 | 64 | 116.24% | 123.07% | 137.33% |
| Worst Case | | 365.63% | 515.63% | 890.63% |
| Average Case | | 199.74% | 251.74% | 376.50% |

TABLE 5

An example of block size dependent filter selection when 4 × 4 motion block is disabled

| Block Size | | Memory Bandwidth Expansion | | |
|---|---|---|---|---|
| Width | Height | 6-tap | 8-tap | 12-tap |
| 4 | 4 | — | — | — |
| 4 | 8 | 365.63% | — | — |
| 8 | 4 | 365.63% | — | — |
| 8 | 8 | | 351.56% | — |
| 16 | 8 | | 269.53% | — |
| 8 | 16 | | 269.53% | — |
| 16 | 16 | | | 284.77% |
| 32 | 16 | | | 226.76% |
| 16 | 32 | | | 226.76% |
| 32 | 32 | | | 180.57% |
| 64 | 32 | | | 157.47% |
| 32 | 64 | | | 157.47% |
| 64 | 64 | | | 137.33% |
| Worst Case | | | 365.63% | |
| Average Case | | | 249.42% | |

The block size dependent motion compensation engine 100 can be implemented in hardware, software, firmware, or a combination thereof. In one embodiment, the motion compensation and filtering system is implemented in software or firmware that is stored in a memory and that is executed by a processor based on a suitable instruction execution system. In another embodiment, the motion compensation and filtering system is implemented in hardware, and hence implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
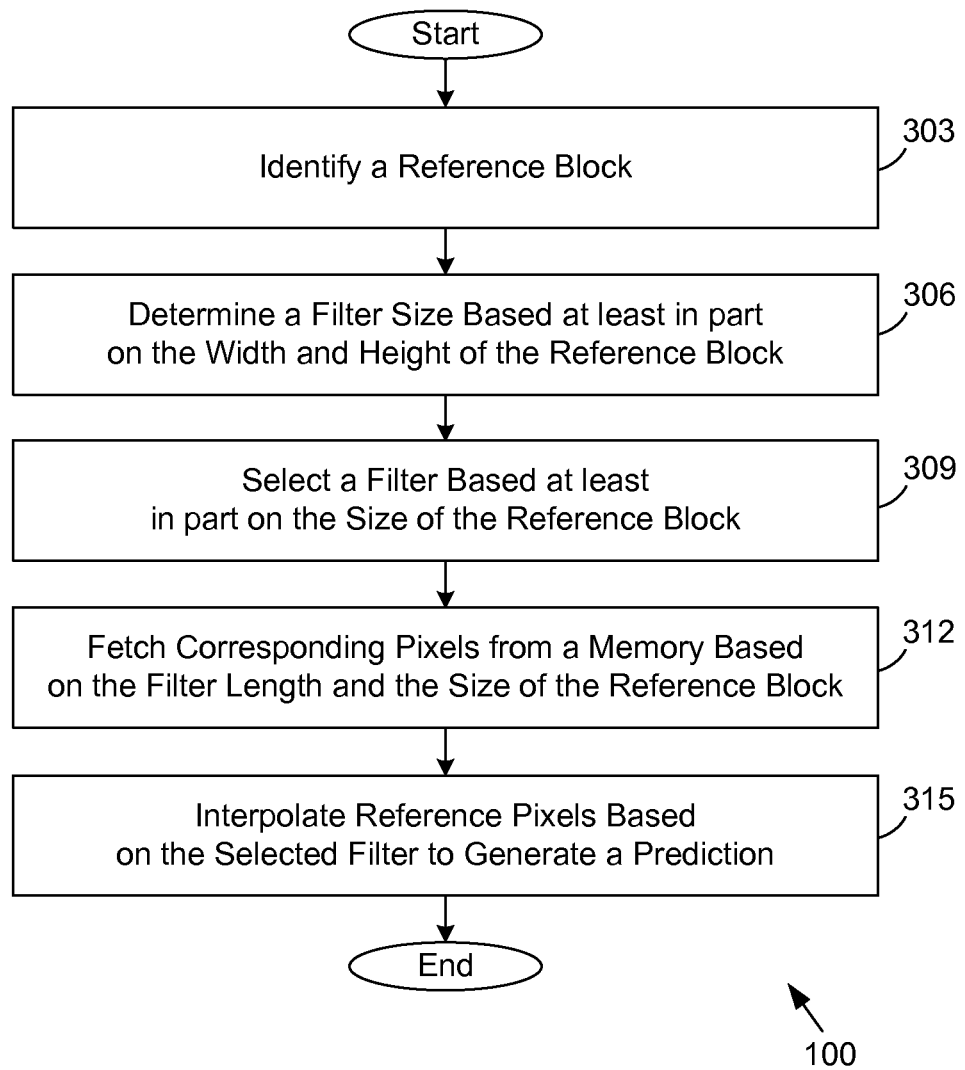
FIG. 3 is a flowchart illustrating one example of functionality implemented as portions of the motion compensation and filtering system of FIG. 1 according to various embodiments of the present disclosure.

Having described certain embodiments of a motion compensation and filtering system, it should be appreciated that one method embodiment implemented by the block size dependent motion compensation engine 100, illustrated in FIG. 3 and denoted as method 300, comprises identifying a reference block (303), determining a filter size according to a width and height of the reference block (306), selecting a filter based on the block size (309), fetching corresponding pixels from a memory based on the filter length and the block size (312), and interpolating reference pixels based on the selected filter to generate a prediction (315). The horizontal filter length and the vertical filter length may be either same or different. As noted above, variations in the method 300 are contemplated, including the disablement of certain motion blocks (e.g., 4×4) and distributing the steps of the method 300 among further steps or omitting some steps in some embodiments.

Any process descriptions or blocks in the flow diagram of FIG. 3 should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

It should be emphasized that the above-described embodiments of the present invention are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of this disclosure and the present invention and protected by the following claims.

Therefore, the following is claimed:

1. A system, comprising:
   a decoded picture buffer;
   a pixel fetcher configured to:
   determine, for each of a plurality of filters having different filter lengths, a memory expansion based on a width and a height of a reference block of a plurality of corresponding pixels from the decoded picture buffer;
   select a filter of the plurality of filters based on the determined memory expansion for each of the plurality of filters; and
   fetch the corresponding pixels from the decoded picture buffer based on the selected filter length and the block size; and
   a multi-filter interpolator communicatively coupled to the fetcher, the multi-filter interpolator configured to:
   select the filter of the plurality of filters based on the block size or the filter type selected by the pixel fetcher; and
   interpolate reference pixels based on the selected filter to generate a prediction.

2. The system of claim 1, wherein the system is embodied in an encoder or a decoder.

3. The system of claim 1, wherein the block size dependent reference pixel fetcher is further configured to disable N×M motion blocks according to a block size restriction.

4. The system of claim 3, wherein N and M are each equal to four (4).

5. The system of claim 3, wherein N is equal to either four (4) or eight (8) and M is equal to either four (4) or eight (8).

6. The system of claim 1, wherein the block size dependent reference pixel fetcher is further configured to disable bi-directional prediction for N×M motion blocks.

7. A method, comprising:
   selecting, by circuitry of a pixel fetcher, a filter from a plurality of filters, each filter having a different length, according to a memory expansion associated with a block size of a reference block and the length of the filter;
   fetching, by the circuitry of the pixel fetcher, corresponding pixels from memory based on the length of the selected filter and the block size; and
   interpolating, by circuitry of a multi-filter interpolator, reference pixels based on the selected filter to generate a prediction.

8. The method of claim 7, wherein the block size is based at least in part on a height and a width of the reference block.

9. The method of claim 7, further comprising disabling N×M motion blocks according to a block size restriction.

10. The method of claim 7, further comprising disabling bi-directional prediction for N×M motion blocks.

11. The method of claim 10, wherein N is equal to either four (4) or eight (8) and M is equal to either four (4) or eight (8).

12. An apparatus, comprising:
    a decoded picture buffer;
    a pixel fetcher configured to:
    determine, for each of a plurality of filters having different filter lengths, a memory expansion based on a width and a height of a reference block of a plurality of corresponding pixels from the decoded picture buffer;
    select a filter of the plurality of filters based on the determined memory expansion for each of the plurality of filters; and
    fetch the corresponding pixels from the decoded picture buffer based on the selected filter length and the block size; and
    a multi-filter interpolator coupled to the fetcher, the multi-filter interpolator configured to:
    select the filter of the plurality of filters based on the block size or the filter type from the fetcher; and
    interpolate reference pixels based on the selected filter to generate a prediction.

13. The apparatus of claim 12, wherein the block size dependent reference pixel fetcher is further configured to reject the block size according to a block size restriction.

14. The apparatus of claim 12, further comprising disabling N×M motion blocks.

15. The apparatus of claim 12, wherein the system is embodied in an encoder or a decoder.

16. The apparatus of claim 13, wherein N and M are each equal to four (4).

17. The apparatus of claim 13, wherein N is equal to either four (4) or eight (8) and M is equal to either four (4) or eight (8).

18. The apparatus of claim 14, wherein N and M are each equal to four (4).

19. The system of claim 3, wherein the pixel fetcher is further configured to select the width and height of the reference block from a plurality of predetermined widths and heights; and wherein disabling N×M motion blocks further comprises excluding the values N and M from the plurality of predetermined widths and heights.

20. The method of claim 9, wherein disabling N×M motion blocks further comprises excluding the values N and M from a plurality of predetermined widths and heights, the block size of the reference block selected from the plurality of predetermined widths and heights.

* * * * *